(12) United States Patent
Toda et al.

(10) Patent No.: US 8,028,142 B2
(45) Date of Patent: Sep. 27, 2011

(54) CONTROLLER OF STORAGE DEVICE, STORAGE DEVICE, AND CONTROL METHOD OF STORAGE DEVICE

(75) Inventors: Seiji Toda, Kawasaki (JP); Teruji Yamakawa, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 424 days.

(21) Appl. No.: 12/333,034

(22) Filed: Dec. 11, 2008

(65) Prior Publication Data

US 2009/0271584 A1 Oct. 29, 2009

(30) Foreign Application Priority Data

Apr. 28, 2008 (JP) ................................ 2008-117851

(51) Int. Cl.
*G06F 12/00* (2006.01)
(52) U.S. Cl. ........ 711/163; 711/156; 711/170; 711/173; 711/200
(58) Field of Classification Search ........................ None
See application file for complete search history.

(56) References Cited

U.S. PATENT DOCUMENTS

2002/0026580 A1* 2/2002 Igari ............................ 713/168

FOREIGN PATENT DOCUMENTS

| JP | A 2003-150455 | 5/2003 |
| JP | A 2006-268861 | 10/2006 |
| JP | A 2007-66123 | 3/2007 |

* cited by examiner

*Primary Examiner* — Shawn X Gu
(74) *Attorney, Agent, or Firm* — Greer, Burns & Crain, Ltd.

(57) ABSTRACT

A controller of a storage device having a user area storing an operating system, the storage device developing the operating system stored in the user area on a host device in accordance with an access from the host device. The controller includes a user authentication routine storage controlling unit that stores a user authentication routine for executing user authentication before startup of the operating system, in a predetermined area inside the user area, and an access controlling unit that permits access to the predetermined area from the host device when the user authentication routine is used, while prohibiting access to the predetermined area from the host device when the user authentication routine is not used.

20 Claims, 4 Drawing Sheets

|  | INTERNAL LBA | EXTERNAL LBA |
|---|---|---|
| STARTUP SEQUENCE AREA | 0 TO A | NA (ACCESS PROHIBITED) |
| OS AREA | A TO B | A TO B |
| DATA AREA | B TO C | B TO C |
| USER AUTHENTICATION ROUTINE STORAGE AREA | C TO D | 0 TO A |

CONTROLLER OF STORAGE DEVICE, STORAGE DEVICE, AND CONTROL METHOD OF STORAGE DEVICE

CROSS-REFERENCE TO RELATED APPLICATION

This application is based upon and claims the benefit of priority of the prior Japanese Patent Application No. 2008-117851, filed on Apr. 28, 2008, the entire contents of which are incorporated herein by reference.

FIELD

The embodiments discussed herein are directed to a controller of a storage device, a storage device, and a method of controlling a storage device.

BACKGROUND

Some conventional storage devices send a user authentication routine for executing user authentication to a host device prior to access from the host device to the storage device, and permits data access to the storage device after the user authentication succeeds.

Another types of the conventional storage devices store an authentication program in a Read Only Memory (ROM) area in a hard disk drive (hereinafter, simply referred to as "HDD"), and execute user authentication based on the stored authentication program (see Japanese Patent Application Laid-open No. 2003-150455, for example).

Still another types of the conventional storage devices execute user authentication after startup of boot Operating System (OS) of an external storage medium (see Japanese Patent Application Laid-open No. 2007-66123, for example).

In general, a storage device such as magnetic disk device has a system area that stores firmware (hereinafter, simply referred to as "FW") of the magnetic disk device itself and a user area that stores OS and the like.

The magnetic disk device assigns a logical block address (LBA) to each sector of the user area. One conventional technique allows access to the magnetic disk device using Basic Input/Output System (BIOS) of a host device and the LBA (see Japanese Patent Application Laid-open No. 2006-268861, for example). The host device is prohibited from accessing to the system area inside the magnetic disk device, however, is permitted to access the user area by using LBA.

On the other hand, standard of Storage Working Group (SWG) of Trusted Computing Group (TCG) intends to realize user authentication only by a storage device and a host device. At the startup of the host device, the host device side accesses a part of the storage device called Master Boot Record (MBR) and executes OS startup sequence via this part of MBR.

A storage device implementing TCG standard maps a specific area for reading a user authentication routine to an area accessed at the OS startup, and reads in the user authentication routine in a similar way as the OS startup sequence, and executes the read user authentication routine. When the user authentication is succeeded, the OS startup sequence is executed.

Because the TCG standard is a conceptual standard under planning, there is no specific definition about the area for storing a user authentication routine. For example, in a storage device such as magnetic disk device having only two kinds of areas, namely a user area and a system area, it is conceivable to store a user authentication routine in an user area which is accessible from the host device rather than in a special area separately provided for storing the user authentication routine.

However, when a user authentication routine is stored in the user area, the host device can easily access the user authentication routine. For example, not to mention the setting before the startup of OS which does not require user authentication, even after completion of user authentication, namely when a user authentication routine is not used, access to the user authentication routine from the host device is permitted. Therefore, it is difficult to comply with the TCG standard that prohibits access to the user authentication routine from the host device when the user authentication routine is not used.

SUMMARY

It is an object of the present invention to at least partially solve the problems in the conventional technology.

According to an aspect of an embodiment, a controller of a storage device having a user area storing an operating system, the storage device developing the operating system stored in the user area on a host device in accordance with an access from the host device, the controller includes a user authentication routine storage controlling unit that stores a user authentication routine for executing user authentication before startup of the operating system, in a predetermined area inside the user area, and an access controlling unit that permits access to the predetermined area from the host device when the user authentication routine is used, while prohibiting access to the predetermined area from the host device when the user authentication routine is not used.

According to another aspect of an embodiment, a storage device having a user area storing an operating system, the storage device developing the operating system stored in the user area on a host device in accordance with an access from the host device, the controller includes a user authentication routine storage controlling unit that stores a user authentication routine for executing user authentication before startup of the operating system, in a predetermined area inside the user area, and an access controlling unit that permits access to the predetermined area from the host device when the user authentication routine is used, while prohibiting access to the predetermined area from the host device when the user authentication routine is not used.

According to still another aspect of an embodiment, a method of controlling a storage device having a user area storing an operating system, the storage device developing the operating system stored in the user area on a host device in accordance with an access from the host device, the method includes storing a user authentication routine for executing user authentication before startup of the operating system, in a predetermined area inside the user area, and controlling an access by permitting access to the predetermined area from the host device when the user authentication routine is used, while prohibiting access to the predetermined area from the host device when the user authentication routine is not used.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Exemplary embodiments of a controller of a storage device, a storage device, and a method of controlling a storage device of the present invention will be explained in detail below with reference to the attached drawings.

Firstly, outline of the present embodiments will be explained. A user authentication routine that executes user authentication before startup of OS is stored, for example, in a predetermined area inside a user area of a magnetic disk device. When the user authentication routine is used, access to the predetermined area from the BIOS on the host device is permitted. When the user authentication routine is not used, access to the predetermined area from the BIOS on the host device is prohibited. As a result, conformability to the TCG standard is achieved by prohibiting access to the user authentication routine from the BIOS on the host device when the user authentication routine is not used, while the user authentication routine is stored in an existent user area.

Figure 1:
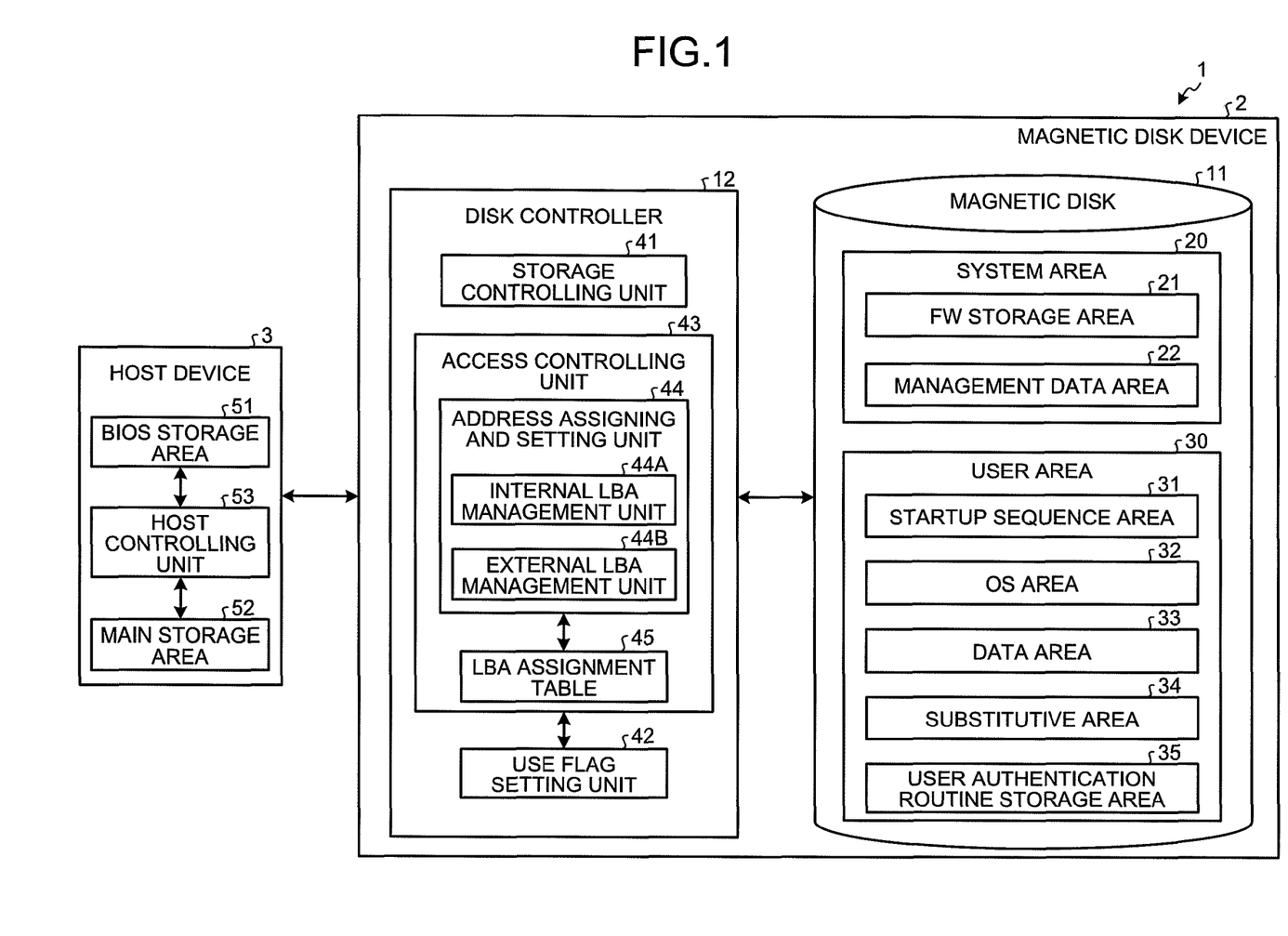
FIG. 1 is a block diagram depicting an overall configuration inside an information processing apparatus of an embodiment.

FIG. 1 is a block diagram depicting outline structure inside an information processing apparatus of the present embodiment.

An information processing apparatus 1 depicted in FIG. 1 has a magnetic disk device 2 that stores various information such as OS, and a host device 3 that executes a control processing operation based on the various information stored in the magnetic disk device 2.

The magnetic disk device 2 has a magnetic disk 11 storing various information, and a disk controller 12 that controls driving of the magnetic disk 11 and controls the overall magnetic disk device 2.

The magnetic disk 11 has a system area 20 that stores FW, control data and the like, and a user area 30 that stores OS, user data and the like.

The system area 20 is an area that is inaccessible from the host device 3. The system area 20 has a FW storage area 21 for storing FW, and a management data area 22 for storing various management data.

Further, the user area 30 is an area that is accessible from the host device 3. The user area 30 has a startup sequence area 31 for storing startup sequence such as boot loader for starting up OS, an OS area 32 for storing OS, and a data area 33 for storing user data. Further, the user area 30 has a substitutive area 34 which is an auxiliary area that allows substitution of a defective sector when defect occurs in an unit of sector, and a user authentication routine storage area 35 for storing a user authentication routine for executing user authentication before startup of OS. In the present embodiment, the startup sequence area 31 and the OS area 32 for storing OS are described as separate areas; however, not limited to this configuration, the startup sequence area 31 and the OS area 32 for storing OS are generally handled as a single area.

The management data area 22 inside the system area 20 stores management data that manages a substitutive sector in substituting a defective sector of the user area 30 by the substitutive area 34.

The host device 3 has a BIOS storage area 51 that stores BIOS, a main storage area 52 that reads OS, a user authentication routine, a startup sequence and the like being stored inside the magnetic disk device 2, and a host controlling unit 53 that executes a processing operation based on OS, user authentication routine or the startup sequence being developed in the main storage area 52.

The disk controller 12 inside the magnetic disk device 2 makes the host device 3 read OS stored in the user area 30, for example, in response to access from the host device 3, and develops the read OS on the host device 3.

The disk controller 12 has a storage controlling unit 41 that controls storage of various information in the user area 30 and in the system area 20, and the storage controlling unit 41 stores, for example, a startup sequence for starting up OS in the startup sequence area 31 inside the user area 30, and stores OS in the OS area 32, and stores a user authentication routine in the user authentication routine storage area 35.

The disk controller 12 has a use flag setting unit 42 that sets a use flag indicating whether user authentication routine is used.

When use flag is being set, the use flag setting unit 42 sets user authentication before startup of OS being effective, namely, sets as the case where the user authentication routine is used. On the other hand, when the use flag is not being set, the use flag setting unit 42 sets user authentication before startup of OS being ineffective, namely, sets as the case where the user authentication routine is not used.

The disk controller 12 has an access controlling unit 43 that determines that user authentication before startup of OS is effective, namely as the case where the user authentication routine is used, when the use flag is being set in the use flag setting unit 42, and permits access to the user authentication routine storage area 35 from the host device 3.

The access controlling unit 43 determines that user authentication before startup of OS is ineffective, namely as the case where the user authentication routine is not used, when the use flag is not being set in the use flag setting unit 42, and prohibits access to the user authentication routine storage area 35 from the host device 3.

The access controlling unit 43 prohibits access to the user authentication routine storage area 35 from the host device 3 when user authentication in the user authentication routine is succeeded.

The access controlling unit 43 has an address assigning and setting unit 44 that assigns and sets address of the user authentication routine storage area 35 to an external LBA as will be described later, to which access to the user authentication routine storage area 35 from the host device 3 is permitted, in order to permit access to the user authentication routine storage area 35 from the host device 3.

Also, the address assigning and setting unit 44 prohibits assigning and setting of external LBA to address of the user authentication routine storage area 35, namely does not assign and set external LBA in order to prohibit access to the user authentication routine storage area 35 from the host device 3.

The address assigning and setting unit 44 has an internal LBA management unit 44A that manages the entire area of the user area 30 by internal LBA, and an external LBA management unit 44B that manages accessible areas of the host device 3 in the user area 30 by external LBA.

Figure 2:
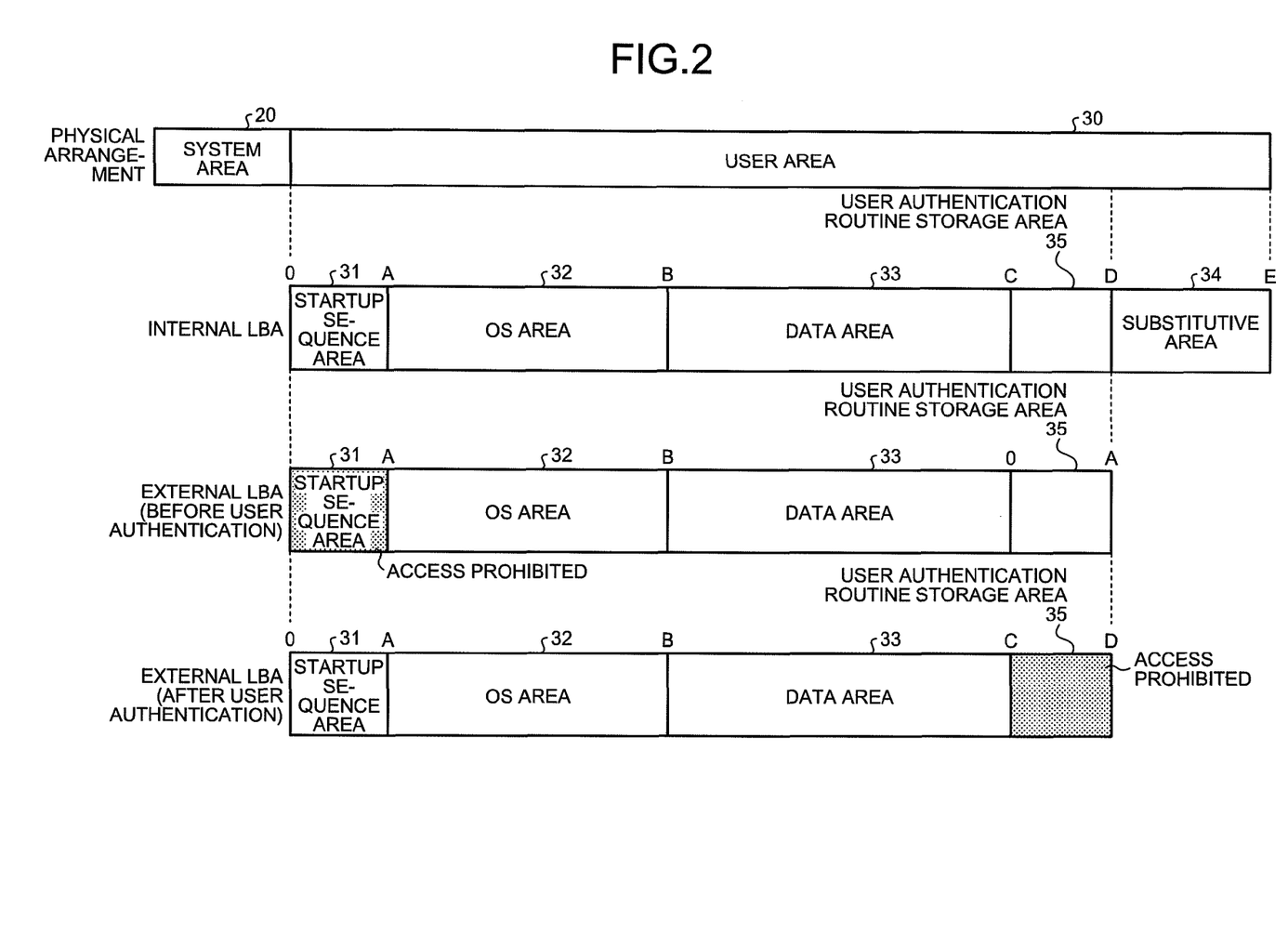
FIG. 2 is a drawing for explaining data structure in a user area of a magnetic disk inside a magnetic disk device of an embodiment.

FIG. 2 is an explanatory view simply representing data structure of the user area 30.

The user area 30 depicted in FIG. 2 has the startup sequence area 31, the OS area 32, the data area 33, the user authentication routine storage area 35 and the substitutive area 34, and 0-A of internal LBA is assigned to the startup sequence area 31, A-B of internal LBA is assigned to the OS area 32, B-C of internal LBA is assigned to the data area 33, C-D of internal LBA is assigned to the user authentication routine storage area 35, and D-E of internal LBA is assigned to the substitutive area 34.

In the host device 3, 0-A of external LBA is first accessed as a leading address, for example, as MBR.

Figure 3:
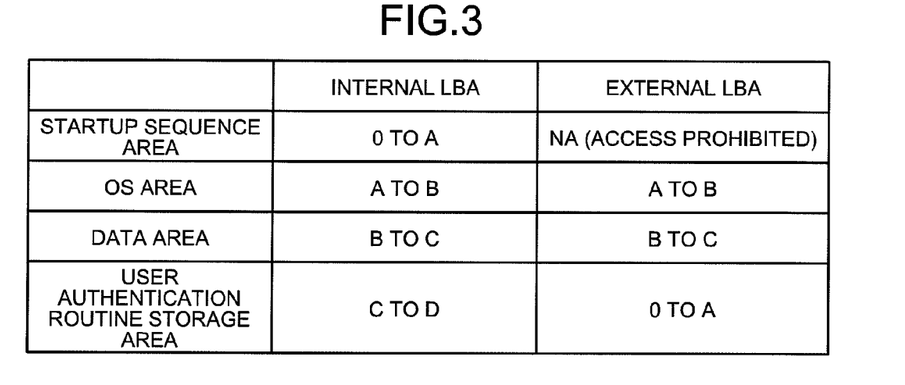
FIG. 3 is an explanatory view simply representing table content of a LBA assignment table inside the magnetic disk device of an embodiment.

The access controlling unit 43 has a LBA assignment table 45 according to which the address assigning and setting unit 44 sets external LBA for each internal LBA of the startup sequence area 31, the OS area 32, the data area 33, and the user authentication routine storage area 35 of the user area 30, as depicted in FIG. 3, when the user authentication routine is used.

The address assigning and setting unit 44 assigns and sets address of the user authentication routine storage area 35 of C-D of internal LBA to 0-A of external LBA where the host device 3 is accessible to the user authentication routine storage area 35, based on a table content of the LBA assignment table 45 depicted in FIG. 3, when the user authentication routine is used.

At this time, when the address of the user authentication routine storage area 35 is set at 0-A of external LBA, the address assigning and setting unit 44 does not assign and set external LBA so as to prohibit access from the host device 3 to address of the original startup sequence area 31 of 0-A of internal LBA, based on the table content of the LBA assignment table 45 depicted in FIG. 3. In the host device 3, since access is made based on external LBA, access to the startup sequence area 31 where external LBA is not assigned and set is prohibited.

As a result, the host device 3 accesses to the user authentication routine storage area 35 based on 0-A of external LBA, reads the user authentication routine being stored in the user authentication routine storage area 35 into the main storage area 52, and executes the user authentication routine read into the main storage area 52.

Further, when the user authentication in the user authentication routine is succeeded, the address assigning and setting unit 44 assigns and sets 0-A of external LBA being assigned and set to the user authentication routine storage area 35 to the original startup sequence area 31 of 0-A of internal LBA.

At this time, when 0-A of external LBA is set for the startup sequence area 31, the address assigning and setting unit 44 does not assign and set external LBA so as to prohibit access to address of the user authentication routine storage area 35 of C-D of internal LBA by the host device 3. The host device 3 is prohibited from accessing the user authentication routine storage area 35 for which external LBA is not assigned and set.

As a result, the host device 3 accesses to the startup sequence area 31 based on 0-A of external LBA, reads the startup sequence being stored in the startup sequence area 31 into the main storage area 52, and executes the startup sequence read into the main storage area 52.

When the user authentication routine is not used, the address assigning and setting unit 44 does not assign and set external LBA to address of the user authentication routine storage area 35 so as to prohibit access to the user authentication routine storage area 35 from the host device 3.

Thus the user authentication routine storage area 35 is now stored in the user area 30, and can be substituted by the substitutive area 34 even when a defect occurs in a unit of sector.

Figure 4:
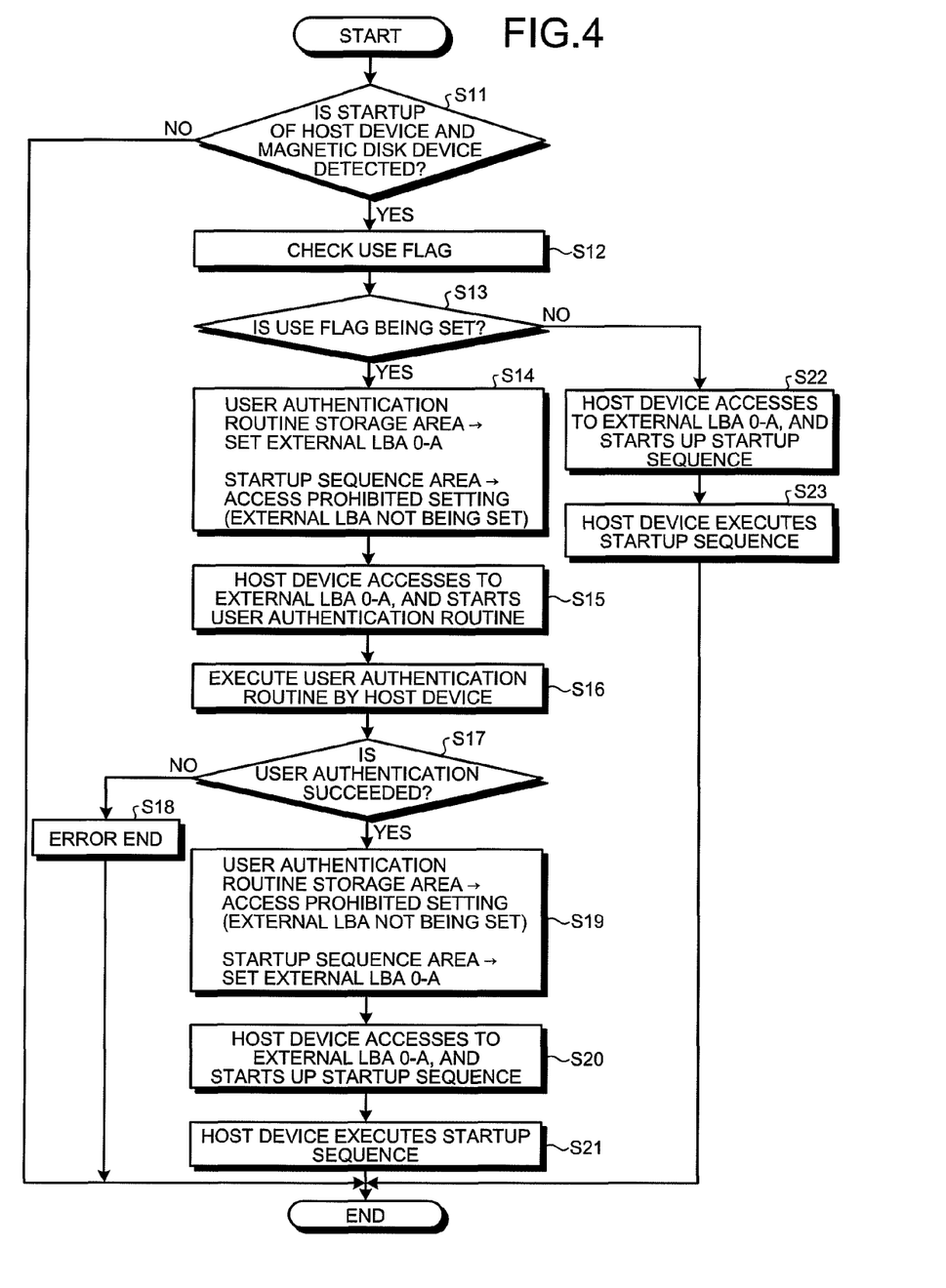
FIG. 4 is a flowchart depicting a processing operation of the entire information processing apparatus concerning OS startup process of an embodiment.

Next, operation of the information processing apparatus 1 of the present embodiment will be explained. FIG. 4 is a flowchart of a processing operation of the entire information processing apparatus 1 concerning OS startup process of the present embodiment.

The OS startup process depicted in FIG. 4 is a process for starting up OS in response to startup of the host device 3 and the magnetic disk device 2.

In FIG. 4, the disk controller 12 on the side of the magnetic disk device 2 determines whether startup of the magnetic disk device 2 and the host device 3 is detected (Step S11).

When startup of the magnetic disk device 2 and the host device 3 is detected ("YES" at Step S11), the disk controller 12 checks the use flag setting of the use flag setting unit 42 (Step S12), and determines whether the use flag is being set (Step S13).

When the use flag is being set ("YES" at Step S13), the disk controller 12 determines that user authentication before startup of OS is effective, namely, the user authentication routine is used, and assigns and sets address of the user authentication routine storage area 35 of C-D of internal LBA to 0-A of external LBA based on the table content of the LBA assignment table 45 via the address assigning and setting unit 44, while not assigning and setting address of the startup sequence area 31 of 0-A of internal LBA to external LBA so as to prohibit access from the host device 3 (Step S14).

As a result, the host device 3 is prohibited from accessing the startup sequence area 31 for which external LBA is not assigned and set.

The host device 3 accesses the user authentication routine storage area 35 based on 0-A of external LBA, reads the user authentication routine being stored in the user authentication routine storage area 35 into the main storage area 52, starts up the read user authentication routine (Step S15), and executes the user authentication routine (Step S16).

Upon execution of the user authentication routine, the host device 3 determines whether the user authentication is succeeded (Step S17). Success of the user authentication means coincidence of password, ID and the like.

When the user authentication is not succeeded ("NO" at Step S17), the disk controller 12 executes an error end process so as to prohibit startup of OS (Step S18), and ends the OS startup process in FIG. 4.

When the user authentication is succeeded ("YES" at Step S17), the disk controller 12 assigns and sets address of the startup sequence area 31 to 0-A of external LBA based on the table content of the LBA assignment table 45 via the address assigning and setting unit 44, while not assigning and setting an address of the user authentication routine storage area 35 of C-D of internal LBA to external LBA so as to prohibit access from the host device 3 (Step S19).

As a result, the host device 3 is prohibited from accessing the user authentication routine storage area 35 for which external LBA is not assigned and set.

The host device 3 accesses the startup sequence area 31 based on 0-A of external LBA, reads the startup sequence being stored in the startup sequence area 31 into the main storage area 52, starts up the read startup sequence (Step S20), and executes the startup sequence (Step S21), to thereby end the OS startup process of FIG. 4.

When startup of the magnetic disk device 2 and the host device 3 is not detected in Step S11 ("NO" at Step S11), the disk controller 12 ends the OS startup process of FIG. 4.

When the use flag is not being set in Step S13 ("NO" at Step S13), the disk controller 12 determines that user authentication before startup of OS is ineffective, namely, the user authentication routine is not used, and assigns and sets address of the startup sequence area 31 to 0-A of external LBA via the address assigning and setting unit 44, while not assigning and setting address of the user authentication routine storage area 35 to external LBA as usual.

As a result, the host device 3 is prohibited from accessing the user authentication routine storage area 35 for which external LBA is not assigned and set.

The host device 3 accesses the startup sequence area 31 based on 0-A of external LBA, reads the startup sequence being stored in the startup sequence area 31 into the main storage area 52, starts up the read startup sequence (Step S22), and executes the startup sequence (Step S23), to thereby end the OS startup process of FIG. 4.

According to the OS startup process depicted in FIG. 4, when the use flag is being set, it is determined that user authentication before startup of OS is effective, and an address of the user authentication routine storage area 35 which is inaccessible from the host device 3 is assigned and set to 0-A of external LBA, and external LBA is not assigned and set for the startup sequence area 31 of 0-A of internal LBA to prohibit access thereto. As a result, the host device 3 is permitted to access to the user authentication routine storage area 35 based on 0-A of external LBA, read the user authentication routine being stored in the user authentication routine storage area 35, and execute the user authentication routine before startup of OS.

Further, according to the OS startup process, when the use flag is not being set, it is determined that user authentication before startup of OS is ineffective, and the host device 3 accesses to the startup sequence area 31 of 0-A of external LBA as usual, and external LBA is not assigned and set for the user authentication routine storage area 35 of C-D of internal LBA so as to prohibit access thereto from the host device 3. As a result, the host device 3 is permitted to access to the startup sequence area 31 based on 0-A of external LBA, read the startup sequence being stored in startup sequence area 31, and execute the startup sequence.

Further, according to the OS startup process, when user authentication in the user authentication routine is succeeded, external LBA is not assigned and set for the user authentication routine storage area 35 so as to prohibit access thereto, and 0-A of external LBA is assigned and set to the startup sequence area 31 to which access is being prohibited. As a result, the host device 3 accesses to the startup sequence area 31 based on 0-A of external LBA, reads the startup sequence being stored into the startup sequence area 31, and executes the startup sequence. At the side of the host device 3, since access to the user authentication routine storage area 35 is prohibited on the side of the host device 3 after success of the user authentication, such a situation that user authentication routine starts up can be prevented.

According to the present embodiment, the user authentication routine that executes user authentication before startup of OS is stored in the user authentication routine storage area 35 inside the user area 30, and when the user authentication routine is used, access to the user authentication routine storage area 35 from the host device 3 is permitted, while when the user authentication routine is not used, access to the user authentication routine storage area 35 from the host device 3 is prohibited. As a result, TCG standard is passed by prohibiting access to the user authentication routine from the host device 3 when the user authentication routine is not used, while storing the user authentication routine in an existent user area.

Further, according to the present embodiment, when the user authentication is succeeded in the user authentication routine, access to the user authentication routine storage area 35 from the host device 3 is prohibited. Therefore, TCG standard is passed by prohibiting access to the user authentication routine from the host device 3 after success of the user authentication.

According to the present embodiment, when the user authentication routine is used, address of the user authentication routine storage area 35 is assigned and set to 0-A of external LBA, whereas when the user authentication routine is not used, external LBA is not assigned and set for address of the user authentication routine storage area 35 so as to prohibit access to the user authentication routine storage area 35 from the host device 3. As a result, TCG standard is passed by prohibiting access to the user authentication routine from the host device 3 when the user authentication routine is not used.

According to the present embodiment, the startup sequence is stored in the startup sequence area 31 of the user area 30 corresponding to 0-A of internal LBA, and when the user authentication routine is used, address of the user authentication routine storage area 35 is assigned and set to 0-A of external LBA. After that, when user authentication is succeeded in the user authentication routine, external LBA is not assigned and set for an address of the user authentication routine storage area 35, and the startup sequence area 31 is assigned and set to 0-A of external LBA. As a result, the host device 3 accesses to the startup sequence area 31 based on 0-A of external LBA, reads the startup sequence being stored in the startup sequence area 31, and executes the startup sequence, while on the side of the host device 3, access to the user authentication routine storage area 35 is prohibited. Therefore, such a situation that user authentication routine starts up can be prevented.

Further, according to the present embodiment, the user authentication routine storage area 35 that stores the user authentication routine is arranged in the user area 30. As a result, even when a defect occurs in a unit of sector in the user authentication routine storage area 35, the user authentication routine storage area 35 may be substituted by the substitutive area 34, so that it is possible to ensure the reliability by defective resistance while ensuring sector quality of the user authentication routine storage area 35.

In the above embodiment, the magnetic disk device 2 is described as an example, however, similar effect is obtained in a storage device such as magneto optical disk device, flash disk, silicon disk like semiconductor memory storage device.

Further, in the above embodiment, in order to prohibit access from the host device 3, external LBA accessible from the host device 3 is not assigned and set in the address assigning and setting unit 44, however, it goes without saying that similar effect can be obtained also by assigning and setting an address inaccessible from the host device 3 in order to prohibit access from the host device 3.

Although an embodiment of the present invention was explained in the above, the scope of the technical idea of the present invention is not limited to the embodiment, and various embodiments can be carried out without departing from the technical idea described in claims. The effects described in the present embodiment are not limited thereto.

Among various processes explained in the present embodiment, all or part of the process explained as being executed automatically may be conducted manually, and contrarily all or part of the process explained as being executed manually may be conducted automatically. Further, information including processing procedure, control procedure, specific name, various data and parameter explained in the present embodiment are changeable as appropriate unless otherwise specified.

Each constituent of each device depicted in the drawing is merely described in a functionally conceptual manner, and physical structure thereof is not necessarily the one depicted in the drawing, and a specific form of such device is never limited and diminished to that depicted in the drawing.

Further, various processing functions executed in each device may be executed entirely or partly on a microcomputer such as Central Processing Unit (CPU) (or microcomputer such as Micro Processing Unit (MPU), Micro Controller Unit (MCU)) or on a program analyzed and executed by the same CPU (or microcomputer such as MPU, MCU), or on a hardware according to wired logic.

According to the present invention, an effect of conforming to the TCG standard is provided by prohibiting access to the user authentication routine from the host device when the user authentication routine is not used, while storing the user authentication routine in an existent user area.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A controller of a storage device having a user area storing an operating system, the storage device developing the operating system stored in the user area on a host device in accordance with an access from the host device, the controller comprising:
    a user authentication routine storage controlling unit that stores a user authentication routine for executing user authentication before startup of the operating system, in a predetermined area inside the user area, and
    an access controlling unit that permits access to the predetermined area from the host device when the user authentication routine is used, while prohibiting access to the predetermined area from the host device when the user authentication routine is not used.

2. The controller of a storage device according to claim 1, wherein
    the access controlling unit prohibits access to the predetermined area from the host device when user authentication in the user authentication routine is succeeded.

3. The controller of a storage device according to claim 1, wherein
    the access controlling unit has an address assigning and setting unit that assigns and sets address of the predetermined area to an address accessible to the predetermined area from the host device when the user authentication routine is used, while prohibiting assigning and setting of address of the predetermined area to an address accessible to the predetermined area from the host device, when the user authentication routine is not used.

4. The controller of a storage device according to claim 3, wherein the address assigning and setting unit has
    an internal address management unit that manages the entire area of the user area by internal address, and
    an external address management unit that manages an area accessible from the host device, in the user area, by external address, and
    when the user authentication routine is used, address of the predetermined area is assigned and set to an external address accessible to the predetermined area from the host device, while when the user authentication routine is not used, address of the predetermined area is prohibited to be assigned and set to an address accessible from the host device to the predetermined area.

5. The controller of a storage device according to claim 4, wherein
    the address assigning and setting unit assigns and sets an address accessible from the host device to the predetermined area, to a leading address of the external address accessible to the predetermined area from the host device.

6. The controller of a storage device according to claim 4, wherein
    an operating startup routine for making the operating system start up is stored in the user area corresponding to a leading address of the internal address, and
    in the case of using the user authentication routine, when user authentication is succeeded in the user authentication routine after address of the predetermined area is assigned and set to a leading address of the external address accessible to the predetermined area from the host device, the address assigning and setting unit prohibits an address of the predetermined area to be assigned and set to an address accessible to the predetermined area from the host device; and then assigns and sets an area storing the operating startup routine to a leading address of the external address accessible to the predetermined area from the host device.

7. The controller of a storage device according to claim 1, further comprising a use flag setting unit that sets a use flag indicating whether the user authentication routine is used, wherein
    the access controlling unit determines that the user authentication routine is used when the use flag is being set in the use flag setting unit, and determines that the user authentication routine is not used when the use flag is not set in the use flag setting unit.

8. The controller of a storage device according to claim 1, wherein
    the user area has a substitutive area that allows substitution of a defective sector when a defect occurs in a unit of sector in the user area.

9. A storage device having a user area storing an operating system, the storage device developing the operating system stored in the user area on a host device in accordance with an access from the host device, a controller of the storage device comprising:
    a user authentication routine storage controlling unit that stores a user authentication routine for executing user authentication before startup of the operating system, in a predetermined area inside the user area, and
    an access controlling unit that permits access to the predetermined area from the host device when the user authentication routine is used, while prohibiting access to the predetermined area from the host device when the user authentication routine is not used.

10. The storage device according to claim 9, wherein the access controlling unit prohibits access to the predetermined area from the host device when user authentication in the user authentication routine is succeeded.

11. The storage device according to claim 9, wherein the access controlling unit has an address assigning and setting unit that assigns and sets address of the predetermined area to an address accessible to the predetermined area from the host device when the user authentication routine is used, while prohibiting assigning and setting of address of the predetermined area to an address accessible to the predetermined area from the host device, when the user authentication routine is not used.

12. The storage device according to claim 11, wherein the address assigning and setting unit has
an internal address management unit that manages the entire area of the user area by internal address, and
an external address management unit that manages an area accessible from the host device, in the user area, by external address, and
when the user authentication routine is used, address of the predetermined area is assigned and set to an external address accessible to the predetermined area from the host device, while when the user authentication routine is not used, address of the predetermined area is prohibited to be assigned and set to an address accessible from the host device to the predetermined area.

13. The storage device according to claim 12, wherein the address assigning and setting unit assigns and sets an address accessible from the host device to the predetermined area, to a leading address of the external address accessible to the predetermined area from the host device.

14. The storage device according to claim 12, wherein
an operating startup routine for making the operating system start up is stored in the user area corresponding to a leading address of the internal address, and
in the case of using the user authentication routine, when user authentication is succeeded in the user authentication routine after address of the predetermined area is assigned and set to a leading address of the external address accessible to the predetermined area from the host device, the address assigning and setting unit prohibits an address of the predetermined area to be assigned and set to an address accessible to the predetermined area from the host device; and then assigns and sets an area storing the operating startup routine to a leading address of the external address accessible to the predetermined area from the host device.

15. The storage device according to claim 9, further comprising a use flag setting unit that sets a use flag indicating whether the user authentication routine is used, wherein
the access controlling unit determines that the user authentication routine is used when the use flag is being set in the use flag setting unit, and determines that the user authentication routine is not used when the use flag is not set in the use flag setting unit.

16. The storage device according to claim 9, wherein the user area has a substitutive area that allows substitution of a defective sector when a defect occurs in a unit of sector in the user area.

17. A method of controlling a storage device having a user area storing an operating system, the storage device developing the operating system stored in the user area on a host device in accordance with an access from the host device, the method comprising:
storing a user authentication routine for executing user authentication before startup of the operating system, in a predetermined area inside the user area, and
controlling an access by permitting access to the predetermined area from the host device when the user authentication routine is used, while prohibiting access to the predetermined area from the host device when the user authentication routine is not used.

18. The method of controlling a storage device according to claim 17, wherein
the access to the predetermined area from the host device is prohibited when user authentication in the user authentication routine is succeeded.

19. The method of controlling a storage device according to claim 17, wherein
the controlling includes assigning and setting address of the predetermined area to an address accessible to the predetermined area from the host device when the user authentication routine is used, while prohibiting assigning and setting of address of the predetermined area to an address accessible to the predetermined area from the host device, when the user authentication routine is not used.

20. The method of controlling a storage device according to claim 19, wherein the assigning and setting includes
managing the entire area of the user area by internal address, and
managing an area accessible from the host device, in the user area, by external address, and
when the user authentication routine is used, address of the predetermined area is assigned and set to an external address accessible to the predetermined area from the host device, while when the user authentication routine is not used, address of the predetermined area is prohibited to be assigned and set to an address accessible from the host device to the predetermined area.

* * * * *